H. T. HETTINGER.
AWNING HOOK.
APPLICATION FILED SEPT. 11, 1911.
1,071,232.
Patented Aug. 26, 1913.
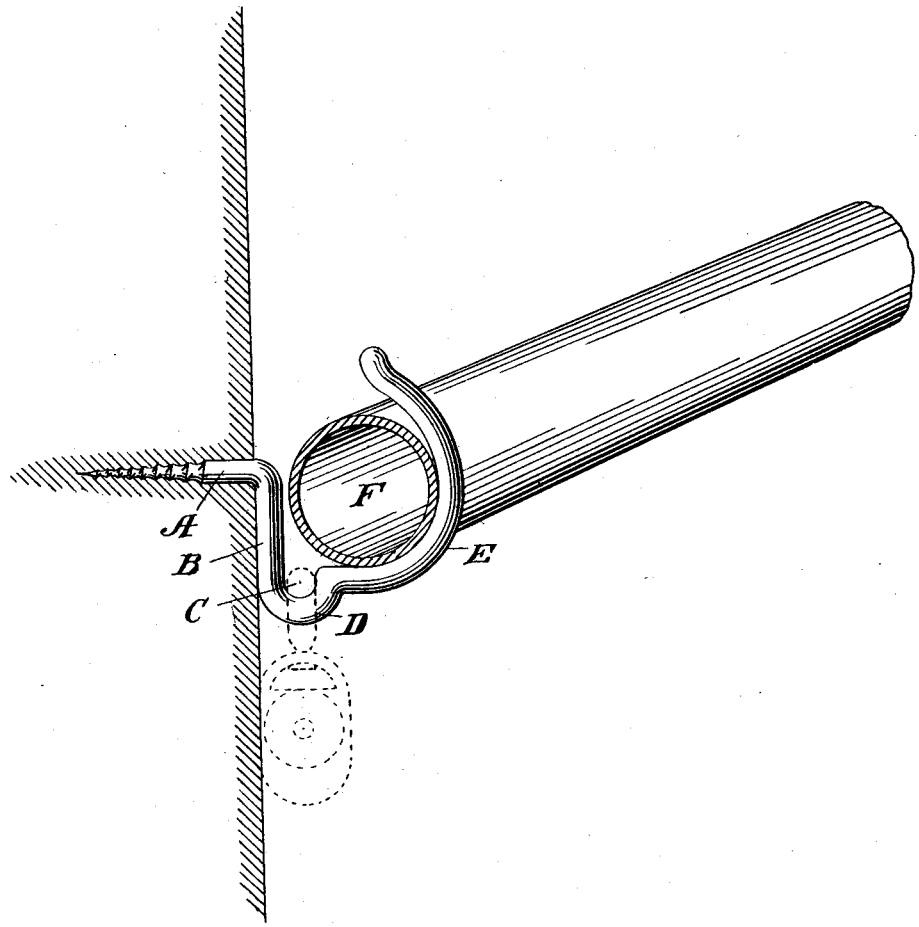
WITNESSES
INVENTOR:
Henry T. Hettinger
BY
ATTORNEY

UNITED STATES PATENT OFFICE.

HENRY T. HETTINGER, OF PITTSBURGH, PENNSYLVANIA.

AWNING-HOOK.

1,071,232.  Specification of Letters Patent.  Patented Aug. 26, 1913.

Application filed September 11, 1911. Serial No. 648,770.

*To all whom it may concern:*

Be it known that I, HENRY T. HETTINGER, a citizen of the United States, residing at Pittsburgh, in the State of Pennsylvania. have invented a certain new and useful Hook for Supporting Awning-Rods and the Like, of which the following is a specification.

The object of my invention is to provide in a simple and inexpensive form an integral hook or support for articles like the head rod of awnings and the pulleys used to raise and lower the awnings, etc.

The drawing shows a side view of the hook in position and a partial view of the pulley and awning head rod.

The invention is essentially a hook, so shaped as to have a small bend near its base for the support of the pulley and arranged so that the strain on this bend is borne by the shank resting against the wall, and a larger and independent bend made to inclose the awning head rod, and so shaped that said rod cannot jump out of the bend. By this design I make a hook in one piece that screws into the wall easily, that is reinforced by the wall support where the strain is greatest, which without extra parts or complicated design holds both the pulley and the head rod, each independently and securely.

A is the threaded end of the hook to be screwed into the wall. The hook is so formed that the shank B rests against the wall and therefore the weight of pulley C in small bend D is largely borne by the wall and the danger of springing the hook open is obviated. The remainder of the hook is shaped substantially as shown and thus holds securely in place the head-rod F, which is forced into its position. The strain on the bend D does not disturb the bend E. This hook is more economical than those now in use for this purpose, as well as being easily attached and detached and is more efficient.

Having thus described my invention, what I claim is:

1. A support for awning head rods and pulleys comprising an integral hook having a screw shank, a sharp downward loop adapted to lie against a wall in which the shank is screwed and support the pulley ring and an outwardly extending larger bend above said loop adapted to resiliently hold the head rod against the wall and out of contact with the pulley ring in the small loop.

2. The combination with an awning head rod and pulley, of an integral supporting hook comprising a screw shank, a sharp downward bend adapted to lie against the wall and support a pulley and an outwardly extending larger bend adapted to hold the head rod against the wall independently of the pulley support.

In testimony I have hereunto signed my name in the presence of the two subscribed witnesses.

HENRY T. HETTINGER.

Witnesses:
J. W. MAYFIELD,
Jo. BAILY BROWN.

Copies of this patent may be obtained for five cents each, by addressing the "Commissioner of Patents, Washington, D. C."